US010206254B2

(12) United States Patent
Nguyen et al.

(10) Patent No.: US 10,206,254 B2
(45) Date of Patent: Feb. 12, 2019

(54) SIGNAGE SYSTEM STABILIZER CIRCUIT

(71) Applicant: GE Lighting Solutions, LLC, East Cleveland, OH (US)

(72) Inventors: Truong-Khoa Nguyen, Laval (CA); Christian Poirier, Montreal (CA); Tung Ngoc Nguyen, Montreal (CA)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 15/805,439

(22) Filed: Nov. 7, 2017

(65) Prior Publication Data

US 2018/0139813 A1 May 17, 2018

Related U.S. Application Data

(60) Provisional application No. 62/421,989, filed on Nov. 14, 2016.

(51) Int. Cl.
*H05B 33/08* (2006.01)

(52) U.S. Cl.
CPC ..... *H05B 33/0821* (2013.01); *H05B 33/0884* (2013.01)

(58) Field of Classification Search
CPC .................. H05B 33/0821; H05B 33/0884
USPC ........................................................ 315/88
See application file for complete search history.

(56) References Cited

U.S. PATENT DOCUMENTS

| 9,345,112 | B2* | 5/2016 | Chen | H03K 17/133 |
| 9,811,139 | B2* | 11/2017 | Tsai | H02J 9/061 |
| 2005/0285445 | A1* | 12/2005 | Wruck | H02J 1/14 |
| | | | | 307/10.1 |
| 2009/0146610 | A1* | 6/2009 | Trigiani | H02J 7/0018 |
| | | | | 320/119 |
| 2010/0237060 | A1* | 9/2010 | Novikov | H05B 1/0272 |
| | | | | 219/488 |
| 2013/0300195 | A1* | 11/2013 | Meng | H02J 9/062 |
| | | | | 307/23 |

FOREIGN PATENT DOCUMENTS

EP 3018678 A1 * 5/2016 ............. H02P 1/265

* cited by examiner

*Primary Examiner* — Dylan C White
(74) *Attorney, Agent, or Firm* — Peter DiMauro; GE Global Patent Operation

(57) ABSTRACT

A stabilizing circuit is disclosed, which may be employed with lighting systems, such as with lighting system power supply operations. The circuit comprises a monitoring circuit configured to detect a characteristic of a power supply, and a switching controller configured to disconnect a primary load from the power supply and connect an auxiliary load to the power supply when the detected characteristic fails to meet a specified parameter. This is done to ensure compatibility and stability of both the power supply and the primary load. For example, when an AC mains voltage providing power to the power supply becomes unstable, the stabilizing circuit may be configured to prevent the power supply from remaining in a self-protection mode that may cause the primary load to become unstable. A method for stabilizing a circuit is also disclosed.

15 Claims, 3 Drawing Sheets

SIGNAGE SYSTEM STABILIZER CIRCUIT

CROSS REFERENCE TO RELATED APPLICATIONS

This application claims the benefit of U.S. provisional application Ser. No. 62/421,989 filed Nov. 14, 2016.

FIELD

The disclosed exemplary embodiments relate generally to lighting systems, and more particularly to lighting system power supply operations.

BACKGROUND

Certain power supplies may enter a self-protection mode when their AC input is unstable or they begin to supply power above a certain threshold. This may be disadvantageous because, while in the self-protection mode, the output of the power supply may provide a limited low voltage and limited low current to an attached load, causing the load to destabilize, oscillate, or otherwise operate in an undesirable or even destructive manner.

SUMMARY

The disclosed embodiments are directed to a stabilizing circuit that monitors the behavior of a power supply and disconnects a primary load and connects one or more auxiliary loads to the power supply in a manner to ensure compatibility and stability of both the power supply and the primary load. In particular, when an AC mains voltage providing power to the power supply is unstable, for example, experiencing glitches, power dips, power supply sags, etc., the disclosed embodiments may be configured to prevent the power supply from remaining in a self-protection mode that may cause the primary load to become unstable.

The disclosed embodiments are configured to monitor the health of the power supply by measuring an output of the power supply. If the output falls outside of a certain range, or generally fails to meet certain parameters, the disclosed embodiments operate to safely disconnect the primary load from the power supply and provide one or more auxiliary loads to the power supply in a controlled fashion. The primary load is allowed to stabilize and shut down in an orderly fashion if required, and then is then reconnected to the power supply, also in a controlled fashion.

In at least one embodiment, a stabilizing circuit includes a monitoring circuit configured to detect at least one characteristic of a power supply, and a switching controller configured to disconnect a primary load from the power supply and connect an auxiliary load to the power supply when the at least one detected characteristic fails to meet a specified parameter.

The monitoring circuit may include at least one comparator configured to compare the at least one detected characteristic to a reference characteristic to determine whether the at least one detected characteristic fails to meet the specified parameter.

The switching controller may be further configured to disconnect the auxiliary load and reconnect the primary load to the power supply when the at least one detected characteristic meets the specified parameter for a predetermined time period.

The stabilizing circuit may include a timer/soft start mechanism for defining the predetermined time period.

The auxiliary load may include a plurality of resistive loads.

The stabilizing circuit may include an adaptive load controller configured to connect and disconnect the auxiliary load under control of the switching controller.

The auxiliary load may include a plurality of resistive loads, and the adaptive load controller comprises switching circuitry for selectively connecting and disconnecting different ones of the plurality of resistive loads.

According to some embodiments, a method for stabilizing a circuit includes monitoring at least one characteristic of a power supply, and disconnecting a primary load from the power supply and connecting an auxiliary load to the power supply when the at least one monitored characteristic of the power supply fails to meet a specified parameter.

The method may include comparing the at least one detected characteristic to a reference characteristic to determine whether the at least one detected characteristic fails to meet the specified parameter.

The method may include disconnecting the auxiliary load from the power supply and re-connecting the primary load to the power supply when the at least one monitored characteristic meets the specified parameter for a predetermined time period.

The auxiliary load may include a plurality of resistive loads and the method may include selectively connecting and disconnecting different ones of the plurality of resistive loads when connecting and disconnecting the auxiliary load.

DETAILED DESCRIPTION

Figure 1:
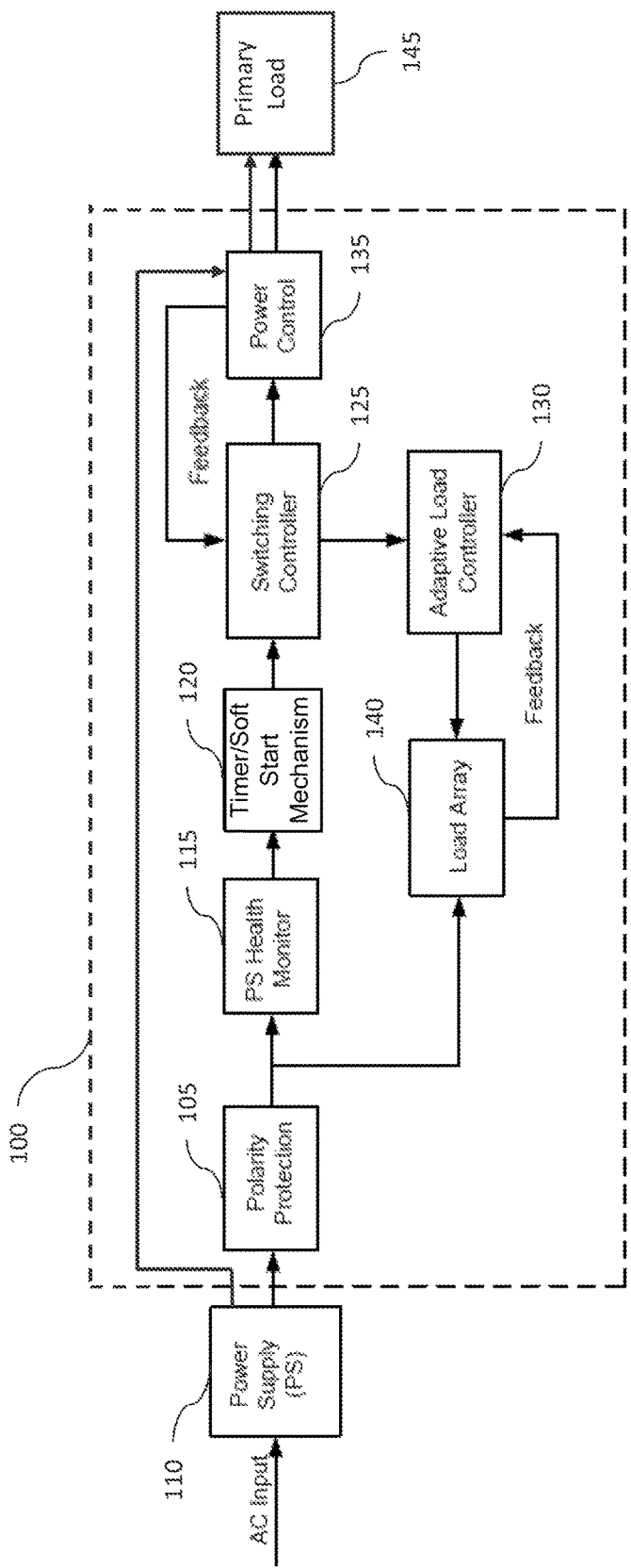
FIG. 1 shows an exemplary block diagram of the circuit 100 according to the disclosed embodiments.

FIG. 1 shows an exemplary block diagram of a stabilizing circuit 100 according to the disclosed embodiments. The stabilizing circuit 100 at least includes a polarity protection circuit 105 connected to the power supply 110, a power supply health monitor circuit 115, a timer/soft start mechanism 120, and a switching controller 125 controlling an adaptive load controller 130 and a power control 135. The adaptive load controller 130 in turn controls a load array 140 including one or more auxiliary loads for the power supply, and the power control 135 provides power to the primary load 145.

It should be understood that in some embodiments, the primary load may be an active load and may include one or more active components. In one or more embodiments, the primary load may be a light emitting diode (LED) light source that may include one or more LEDs, an array of LEDs, and one or more LED driver circuits. In one or more embodiments, the one or more LEDs, array of LEDs, and one or more LED driver circuits may be utilized in a signage application or system. It should also be understood that in some embodiments, the auxiliary load may be a non-active load, for example, a switchable resistor network.

The power supply 110 may include internal protection circuitry that may operate in a self-protective mode to lower or cut off an output voltage or current in the event that an input voltage or current fails to remain within certain parameters. The self-protective mode may also include lowering or cutting off an output voltage or current in the event that an output voltage or current fails to remain within certain parameters. In some embodiments, the power supply may be implemented as a Class 2 power supply, also referred to as an NEC Class 2 power supply with internal protection circuitry that operates in the described self-protective mode. For example, the power supply may initiate a self-protection mode if an output current exceeds 5 A or an output voltage exceeds 60 volts. Exceeding other parameters such as temperature, ripple, or any other operational or environmental parameter may also cause the power supply to initiate a self-protection mode.

The polarity protection circuit 105 provides protection for both the power supply 110 and the stabilizing circuit 100 in the event that the power supply 110 is connected to the stabilizing circuit 100 with reverse polarity. In some embodiments, the polarity protection circuit 105 may provide a high current load to the power supply in the event of a reverse polarity connection, causing the power supply to initiate the self-protection mode. In other embodiments, the polarity protection circuit may operate to isolate or disconnect the power supply 110 when the polarity protection circuit 105 senses a reverse polarity connection. The polarity protection circuit may include any suitable components and may perform any operations suitable for protecting the stabilizing circuit from reverse polarity connections.

The power supply health monitor circuit 115 may monitor current, voltage, temperature, ripple, any parameter including operational and environmental parameters, or any other characteristic of the power supply 110. The power supply health monitor circuit 115 may include any number of electronic components, measurement circuits, processors, memory devices, or other devices for measuring characteristics of the power supply 110 and providing an output indicating whether the measured characteristic or characteristics meet or are within certain parameters. In some embodiments, the power supply health monitor circuit 115 may comprise a comparator to compare one or more power supply characteristics to reference characteristics provided by reference circuits and provide a signal indicating a relationship between the power supply characteristics and the reference characteristics.

The timer/soft start mechanism 120 may be coupled to the power supply health monitor circuit 115 and may operate to start a timer upon receiving an indication that the measured power supply characteristic or characteristics meet or are within the certain parameters. If the measured characteristics remain within the specified parameters during the timer period, the timer/soft start mechanism 120 provides a signal to the switching controller 125. The timer period may be determined by a charging or discharging time of one or more electronic components, such as a resistor capacitor network, or by counting clock pulses of a known frequency, or by any other suitable method.

The switching controller 125 operates the power control 135 and the adaptive load controller 130 to dynamically adjust a load provided to the power supply 110. Upon receiving the signal from the timer/soft start mechanism 120, the switching controller 125 operates the adaptive load controller 130 to disconnect the load array 140 from the power supply 110 and connect the primary load 145 to the power supply 110 in a controlled fashion.

Under control of the switching controller 125, the adaptive load controller 130 comprises switching circuitry to operate to selectively connect or disconnect loads within the load array 140 to the power supply 110. In some embodiments, the load array 140 may include one or more resistive loads (or groups of loads) that may be switched individually or in groups depending on intervals within the timer period of the timer/soft start mechanism 120.

The power control 135 provides a switching function for connecting the primary load 145 to the power supply 110.

Figure 2:
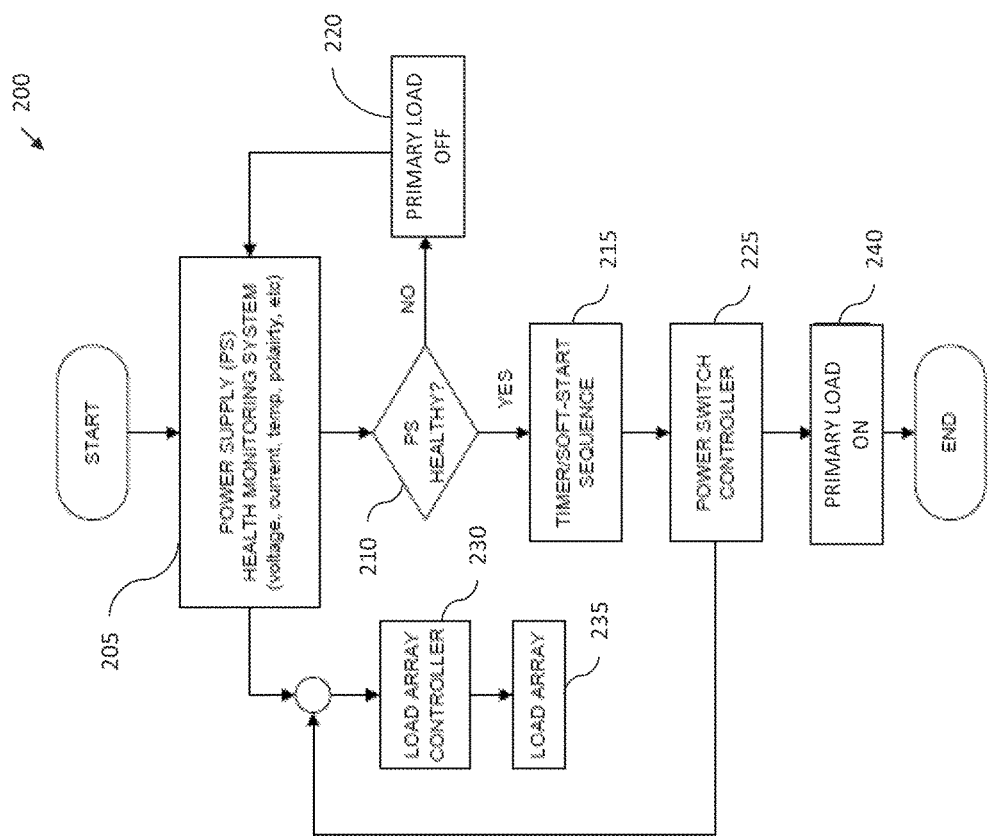
FIG. 2 shows a flow chart of exemplary operations of the disclosed embodiments.

FIG. 2 shows a flow chart of exemplary operations 200 of the disclosed embodiments. As shown in block 205, the power supply health monitor circuit 115 monitors the characteristic of the power supply 110. In block 210, if the measured characteristic or characteristics meet or are within certain parameters, the timer/soft start mechanism 120 starts a timer sequence as shown in block 215. Otherwise, the stabilizing circuit 100 keeps the primary load 145 disconnected from the power supply 110, as shown in block 220. If the measured characteristic or characteristics of the power supply 110 remain within specified parameters during the timer period, the switching controller 125 operates the adaptive load controller 130 to disconnect the load array 140 as shown in blocks 225, 230, and 235, and also to connect the primary load 145 to the power supply 110 as shown in block 240.

Referring back to FIG. 1, in the event that the AC input to the power supply becomes unstable, intermittent, or otherwise unusable, the power supply 110 may enter the self-protection mode, and provide only a limited low voltage and current. The power supply health monitor circuit 115 senses that the output or other health indicator of the power supply 110 is out of specification and causes the output of the timer/soft start mechanism 120 to operate the switching controller 125 to control the adaptive load controller 130 to connect the load array to the output of the power supply 110. The power supply health monitor circuit 115 also causes the output of the timer/soft start mechanism 120 to operate the switching controller to cause the power control 135 to disconnect the primary load 145, in order to prevent improper operation or damage to the primary load. When the power supply health monitor circuit 115 senses that the output or other health indicator of the power supply 110 has returned to be within specification, the power supply health monitoring circuit 115 causes the timer/soft start mechanism 120 to start a timer period and the stabilization circuit 100 continues operations as described above.

Figure 3:
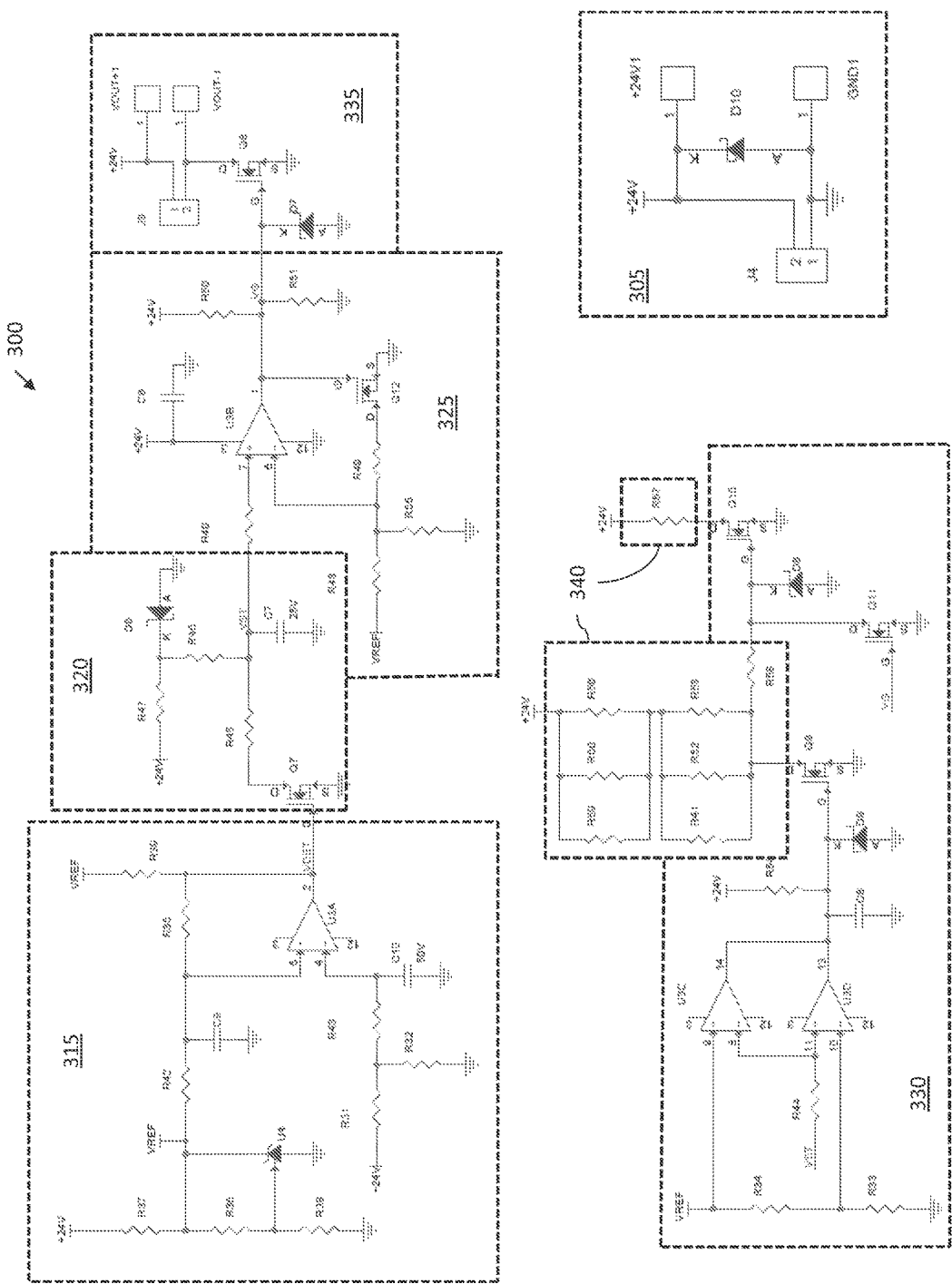
FIG. 3 shows an exemplary schematic of an implementation of the disclosed embodiments.

FIG. 3 shows exemplary embodiments of the components of the stabilizing circuit 100 in schematic form. It should be understood that the schematic representations are non-limiting and that the various components of the stabilizing circuit may be implemented using any suitable components, or combinations of components that may perform the functions described herein. The exemplary schematics of the stabilizing circuit 300 at least include a schematic diagram of an exemplary polarity protection circuit 305, an exemplary power supply health monitor circuit 315, an exemplary timer/soft start mechanism 320, and an exemplary switching controller 325. Also included are an exemplary adaptive load controller 330, an exemplary power control 335, and an exemplary load array 340.

The stabilization circuit 100 advantageously allows normal power supply operations to resume after an AC input voltage to the power supply has become unstable for example, due to a lightning strike, momentary power outage, voltage dip, etc. The stabilization circuit 100 also prevents performance degradation of the primary load, for example, decreased output, flickering, flashing, etc., and may also prevent premature failures of the primary load due to an unstable input from the power supply.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. A stabilizing circuit comprising:
   a monitoring circuit configured to detect at least one characteristic of a power supply; and
   a switching controller configured to disconnect a primary load from the power supply and connect an auxiliary load to the power supply when the at least one detected characteristic fails to meet a specified parameter,
   wherein the monitoring circuit comprises at least one comparator configured to compare the at least one detected characteristic to a reference characteristic to determine whether the at least one detected characteristic fails to meet the specified parameter.

2. The stabilizing circuit of claim 1 wherein the switching controller is further configured to disconnect the auxiliary load and reconnect the primary load to the power supply when the at least one detected characteristic meets the specified parameter for a predetermined time period.

3. The stabilizing circuit of claim 2, comprising a timer start mechanism for defining the predetermined time period.

4. The stabilizing circuit of claim 2, wherein the auxiliary load comprises a plurality of resistive loads.

5. The stabilizing circuit of claim 2, comprising an adaptive load controller configured to connect and disconnect the auxiliary load under control of the switching controller.

6. The stabilizing circuit of claim 2, wherein the auxiliary load comprises a plurality of resistive loads and the adaptive load controller comprises switching circuitry for selectively connecting and disconnecting different ones of the plurality of resistive loads.

7. The stabilizing circuit of claim 2, further comprising a power control connected with the switching controller for providing a switching function for connecting the primary load to the power supply.

8. The stabilizing circuit of claim 1, wherein the primary load comprises a light emitting diode light source.

9. The stabilizing circuit of claim 8, wherein the light emitting diode light source comprises one or more light emitting diodes coupled to one or more LED driver circuits.

10. A stabilizing circuit comprising:
    a monitoring circuit configured to detect at least one characteristic of a power supply; and
    a switching controller configured to disconnect a primary load from the power supply and connect an auxiliary load to the power supply when the at least one detected characteristic fails to meet a specified parameter,
    the circuit further comprising a polarity protection circuit connecting to the power supply for protecting the stabilizing circuit in the event that the power supply is connected to the stabilizing circuit with reverse polarity.

11. A light emitting diode light source comprising:
    one or more light emitting diodes;
    one or more LED driver circuits coupled to the one or more light emitting diodes; and
    a stabilizing circuit comprising:
       a monitoring circuit configured to detect at least one characteristic of a power supply; and
       a switching controller configured to disconnect the light emitting diode light source from the power supply and connect an auxiliary load to the power supply when the at least one detected characteristic fails to meet a specified parameter,
    wherein the switching controller is further configured to disconnect the auxiliary load and reconnect the light emitting diode light source to the power supply when the at least one detected characteristic meets the specified parameter for a predetermined time period.

12. The light emitting diode light source of claim 11, wherein the stabilizing circuit further comprises a power control connected with the switching controller for providing a switching function for connecting the light emitting diode light source to the power supply.

13. A method for stabilizing a circuit of a light emitting diode light source, the method comprising:
    monitoring at least one characteristic of a power supply; and
    disconnecting a primary load from the power supply and connecting an auxiliary load to the power supply when the at least one monitored characteristic of the power supply fails to meet a specified parameter,
    the method further comprising comparing the at least one detected characteristic to a reference characteristic to determine whether the at least one detected characteristic fails to meet the specified parameter.

14. The method of claim 13, comprising disconnecting the auxiliary load from the power supply and re-connecting the primary load to the power supply when the at least one monitored characteristic meets the specified parameter for a predetermined time period.

15. The method of claim 13, wherein the auxiliary load comprises a plurality of resistive loads, the method comprising selectively connecting and disconnecting different ones of the plurality of resistive loads when connecting and disconnecting the auxiliary load.

* * * * *